US012621387B2

(12) United States Patent
Ghosh

(10) Patent No.: US 12,621,387 B2
(45) Date of Patent: May 5, 2026

(54) VOICE ANALYSIS-BASED AGENT ROUTING

(71) Applicant: Wells Fargo Bank, N.A., San Francisco, CA (US)

(72) Inventor: Parul Ghosh, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 148 days.

(21) Appl. No.: 18/646,916

(22) Filed: Apr. 26, 2024

(65) Prior Publication Data

US 2025/0337838 A1 Oct. 30, 2025

(51) Int. Cl.
| | |
|---|---|
| *H04M 3/00* | (2024.01) |
| *G06Q 30/0251* | (2023.01) |
| *G10L 15/18* | (2013.01) |
| *H04M 3/51* | (2006.01) |

(52) U.S. Cl.
CPC ...... *H04M 3/5175* (2013.01); *G06Q 30/0269* (2013.01); *G10L 15/1815* (2013.01)

(58) Field of Classification Search
CPC ............. H04M 3/5175; G06Q 30/0269; G10L 15/1815
USPC ....... 379/265.01–265.14, 266.01–266.1, 309
See application file for complete search history.

(56) References Cited

U.S. PATENT DOCUMENTS

| | | | | |
|---|---|---|---|---|
| 9,148,512 | B1 * | 9/2015 | Kumar ................. | H04M 3/5183 |
| 9,313,332 | B1 * | 4/2016 | Kumar .................... | G10L 17/24 |
| 2003/0200135 | A1 * | 10/2003 | Wright .............. | G06Q 30/0201 |
| | | | | 705/7.29 |
| 2009/0222313 | A1 * | 9/2009 | Kannan .................... | G06N 7/01 |
| | | | | 707/999.005 |
| 2012/0296642 | A1 * | 11/2012 | Shammass .............. | G10L 25/63 |
| | | | | 704/211 |
| 2020/0065835 | A1 * | 2/2020 | Manikandan ...... | G06Q 30/0282 |
| 2022/0270020 | A1 * | 8/2022 | Matula ................ | H04M 3/5141 |
| 2024/0370809 | A1 * | 11/2024 | Cohen .............. | G06Q 10/06395 |
| 2024/0371368 | A1 * | 11/2024 | Intrator ................... | G10L 15/22 |
| 2025/0181420 | A1 * | 6/2025 | Talavera .............. | G06F 9/5083 |

* cited by examiner

*Primary Examiner* — William J Deane, Jr.
(74) *Attorney, Agent, or Firm* — Merchant & Gould P.C.

(57) ABSTRACT
A computer system and method for improving call center routing through analysis of customer interactions including obtaining identifying information for a caller upon initiation of a call, identifying the caller as a repeat customer using the identifying information, retrieving historical interaction data associated with the repeat customer from a database, analyzing any combination of customer audio data, customer call log information, or customer feedback, utilizing an artificial intelligence algorithm to determine a current mood indicator of the customer, calculating a customer behavior score for the repeat customer based on the historical interaction data and the current mood indicator of the customer, and matching the repeat customer to a call agent, based on the customer behavior score.

20 Claims, 6 Drawing Sheets

Caller 50

/ 100

Interactive Voice Response Sub-System 102

Call Agent 60

Network 106

Call Handling Recommendation Device 104

VOICE ANALYSIS-BASED AGENT ROUTING

BACKGROUND

In the evolving landscape of customer service and support, call centers serve as an important interface between businesses and their customers. The environment in call centers, characterized by high volumes of interactions often with frustrated or dissatisfied customers, leads to significant stress, anxiety, and emotional fatigue among employees. This affects their ability to provide high-quality service, resulting in decreased customer satisfaction and loyalty, increased employee turnover, and ultimately, negative impacts on the company's brand and financial performance. The demand for quick resolution of customer issues, combined with the complexity of these interactions, necessitates a solution that supports the employees' mental well-being and enhances their operational efficiency.

SUMMARY

Embodiments of the disclosure are directed to improving call center routing through analysis of customer interactions, including obtaining identifying information for a caller upon initiation of a call, identifying the caller as a repeat customer using the identifying information, retrieving historical interaction data associated with the repeat customer from a database, analyzing any combination of audio data, call log information, or customer feedback, utilizing an artificial intelligence algorithm to determine a current mood indicator of the customer, calculating a customer behavior score for the repeat customer based on the historical interaction data and the current mood indicator of the customer, and matching the repeat customer to a call agent, based on the customer behavior score.

Embodiments also encompass a computer system for managing security vulnerabilities in software development. The computer system is equipped with one or more processors and non-transitory computer-readable storage media which, when executed by the one or more processors, cause the computer system to obtain identifying information for a caller upon initiation of a call, identify the caller as a repeat customer using the identifying information, retrieve historical interaction data associated with the repeat customer from a database, analyze any combination of audio data, call log information, or customer feedback, utilizing an artificial intelligence algorithm to determine a current mood indicator of the customer, calculate a customer behavior score for the repeat customer based on the historical interaction data and the current mood indicator of the customer, and match the repeat customer to a call agent, based on the customer behavior score.

The details of one or more techniques are set forth in the accompanying drawings and the description below. Other features, objects, and advantages of these techniques will be apparent from the description, drawings, and claims.

DETAILED DESCRIPTION

Figure 1:
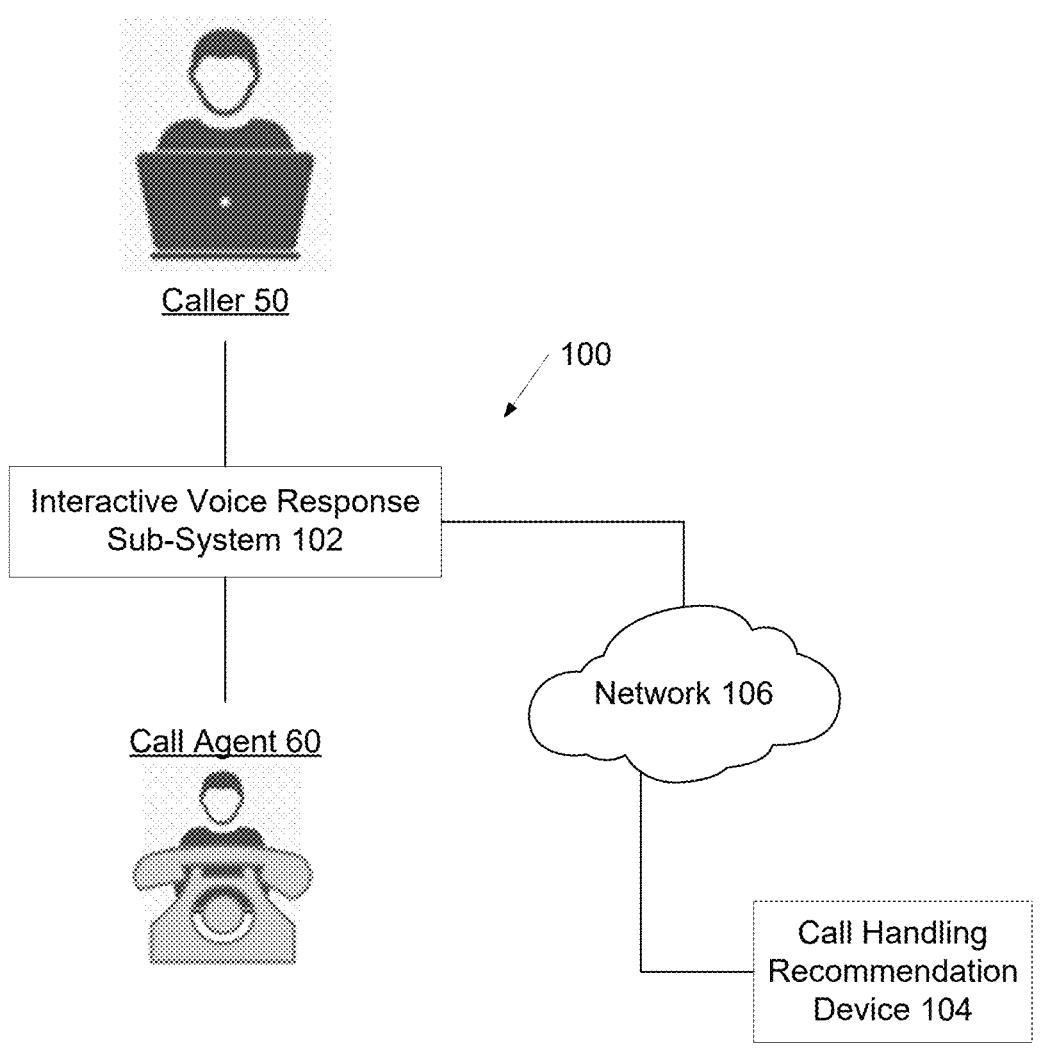
FIG. 1 shows an example of a computer system for improving call center routing through analysis of customer interactions.

This disclosure relates to improving call center routing through analysis of customer interactions.

The disclosed system enhances call center routing efficiency by analyzing customer interactions. The system begins with a collection of identifying information as a call is made, which facilitates recognition of repeat customers. The system can then retrieve a customer's historical interaction data from a comprehensive database. Utilizing artificial intelligence algorithms, the system can analyze a combination of customer audio data, call log information, and/or customer feedback to determine a current mood indicator of the customer. Based on this analysis, a customer behavior score can be calculated, reflecting the customer's historical interactions and current emotional state. This score can then guide the system in matching the customer with a call agent whose expertise aligns with the customer's needs and mood, thereby improving a potential for any interaction between the customer and the call agent to be completed successfully and according to customer protocol guidelines.

In some embodiments, the system can additionally be configured to analyze call agent audio data to determine a current sentiment indicator of the call agent. Determination of a current sentiment indicator enables the matching process to account for both the customer behavior score and the agent's current sentiment, improving interaction outcomes. In scenarios where the current agent sentiment indicator crosses a predefined threshold, the system can be configured to issue a notification (e.g., indicating that the call agent may need a break, etc.), ensuring that agent emotional states remain conducive to positive customer interactions.

Additionally, in some embodiments, the system can be configured to generate call handling instructions for agents based on the customer behavior score, including chat templates tailored to direct conversations in a manner congruent with the repeat customer's identified mood and behavior pattern.

The disclosed technology can leverage both Speech Emotion Recognition (SER) models and Emotional Sentiment Models (ESM) within the artificial intelligence algorithms to provide analysis of customer audio data. The SER model can focus on acoustic features like pitch, volume, and speech rhythm, while the ESM can evaluate linguistic aspects such as word choice, grammar, and inflection, thereby enabling a deeper understanding of the customer's emotional state, and enabling personalized interaction strategies to further improve customer experience and engagement.

Additionally, the system can leverage its analytical capabilities to identify potential products or services for promotion to customers, drawing on insights from both historical interaction data and the current mood indicator. This capability enhances the customer experience by offering personalized solutions while also supporting the call center's sales and marketing strategies.

The disclosed system embodies a technological advancement in the realm of call center operations, leveraging artificial intelligence algorithms to analyze customer interactions in a manner that exceeds the capabilities of the human mind. The complexity and depth of analysis required to ascertain a customer's current mood indicator of every customer, calculate a customer behavior score based on an amalgamation of historical data and real-time emotional assessments, and subsequently match the customer to an optimally suited call agent, involves the processing of large amounts of data at speeds and with a level of accuracy unattainable by human operators, thus grounding the system to a technological application involving the use of artificial intelligence.

Furthermore, the application of SER and ESM within the system operates in a nonconventional and non-generic manner. The ability to dynamically generate call handling instructions, including chat templates tailored to the customer's mood and behavior score, and to identify potential products or services for promotion, are indicative of a practical application in the realm of customer service and support.

FIG. 1 illustrates a schematic of a computer system 100 for improving call center routing through analysis of customer interactions. Although the embodiments described herein may specifically reference interactions involving bank customers, or individuals or businesses engaging with financial institutions or other entities providing financial services or products, the fundamental principles described herein are applicable across a broad spectrum of customer service and support domains.

As depicted in FIG. 1, the computer system 100 embodies a computing environment including an interactive voice response (IVR) subsystem 102, connected to a call handling recommendation device 104 via a network 106.

The IVR subsystem 102 is designed to facilitate an initial interaction between a calling device 50 used by a caller and the call center infrastructure, including an agent device 60 used by a call agent. The IVR subsystem 102 is architected to perform several functions: it acts as the primary interface for incoming calls, engaging the calling device 50 with a series of pre-recorded messages and menu options. Additionally the IVR subsystem 102 can collect information from the calling device 50 through voice responses or touch-tone keypad inputs, disseminating relevant information based on the caller's inquiries, and routing calls to the appropriate agent device 60 based on the caller's needs and the information provided. The IVR subsystem 102 is capable of interfacing with various communication devices, supporting both wired and wireless connections, thereby facilitating a versatile communication channel between the calling device 50 and the agent device 60.

The call handling recommendation device 104, which in some embodiments can be a server or an amalgamation of servers within a server farm, is equipped with computing resources, including at least one processor and a repository for data storage, empowering the call handling recommendation device 104 to conduct analyses of customer interactions. The analytical capabilities of the call handling recommendation device 104 are aimed at extracting actionable insights from the interaction data, which are then utilized to refine and optimize call-center routing strategies. The device undertakes a variety of tasks, such as analyzing the tone, sentiment, and content of customer communications, assessing call agent performance and matching criteria, and generating tailored call handling instructions to improve customer service efficiency and outcomes.

Although depicted as physically distinct devices, shared resources between the IVR subsystem 102 and the call handling recommendation device 104 can including processors and databases, facilitate a unified approach to analyzing interactions and formulating response strategies.

The network 106 functions as the underlying communication framework, enabling data exchange and interaction between the IVR subsystem 102 and the call handling recommendation device 104. The network 106 ensures the reliable and secure exchange of data and commands across the computer system 100, facilitating real-time analysis and response adaptation based on the ongoing customer-agent interactions.

Figure 2:
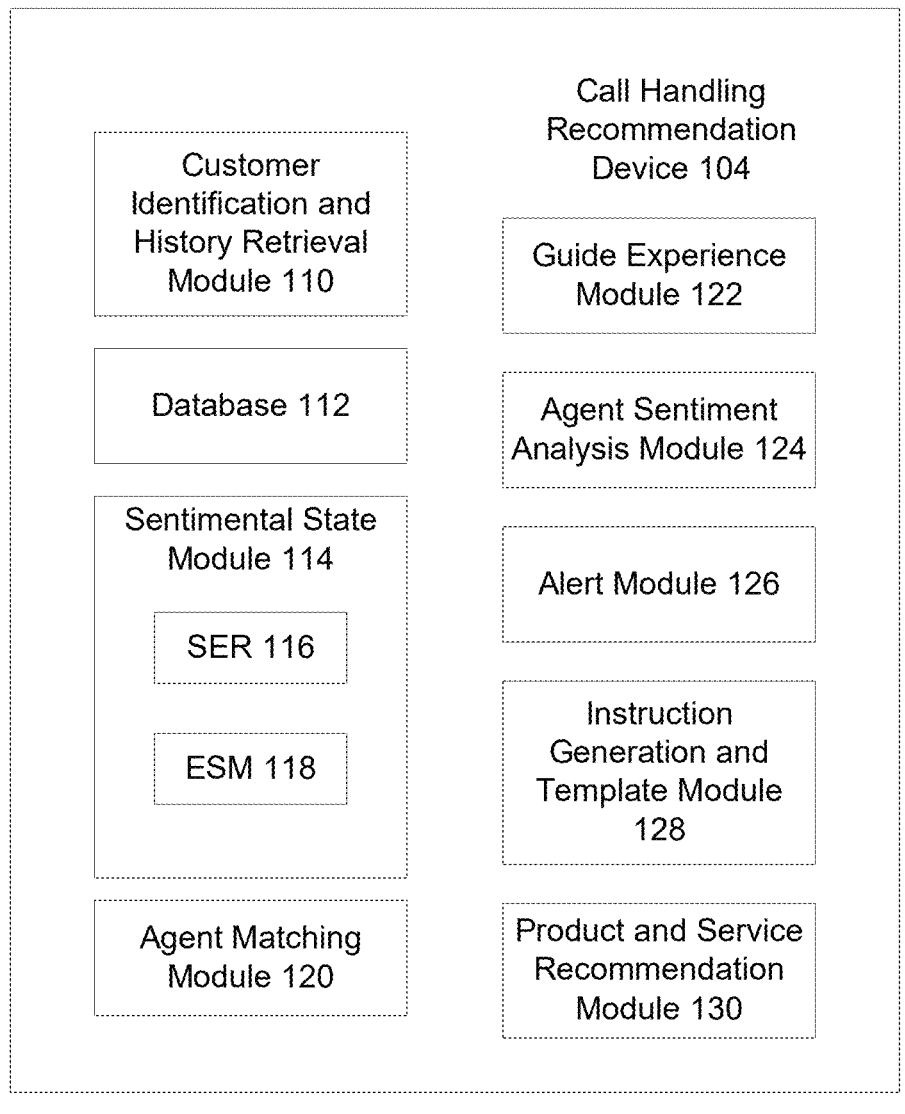
FIG. 2 shows an example call handling recommendation device of the computer system of FIG. 1.

As further depicted in FIG. 2, the call handling recommendation device 104 can comprise one or more modules or engine, with each module or engine configured as a specialized component adapted to perform specific computational processing tasks within the computer system 100. For example, in some embodiments, the call handling recommendation device 104 can include a customer identification and history retrieval module 110, a database 112, a sentimental state module 114, an agent matching module 120, a guide experience module 122, an agent sentiment analysis module 124, an alert module 126, an instruction generation and template module 128, and a product and service recommendation module 130. Together, these modules and engines constitute a comprehensive sub-system within the call handling recommendation device 104 enabling dynamic analysis and optimization of call center interactions.

The computer system 100 facilitates the personalized routing of calls based on detailed customer profiles and behavior patterns, agent capabilities and emotional readiness, and strategic business objectives such as service quality enhancement and sales opportunities maximization. Through the integration of advanced artificial intelligence and machine learning algorithms, the call handling recommendation device 104 offers a scalable solution to improving customer satisfaction and agent performance, contributing to the operational efficiency and effectiveness of call center operations.

The customer identification and history retrieval module 110, in conjunction with the database 112, is configured to acquire identifying information at the inception of a call within a computer system 100. This customer identification and history retrieval module 110 can be configured to acquire information to classify a caller as new, repeat, or existing, for customizing the service rendered according to the specific requirements of the caller.

Upon the initiation of a call, the customer identification and history retrieval module 110 can employ an algorithm to decipher and analyze identifying information. This information can include, but is not limited to, categories such as: customer type, product or service interest, account status, issue or inquiry type, priority level, demographics, and customer nature. These categories facilitate the segmentation of customers, thus enabling agents to deliver specialized support.

For example, in some embodiments, the customer identification and history retrieval module 110 can enable differentiation between individual and business customers, permitting agents to adapt the support based on the recognition that business customers may necessitate scalable solutions covering multiple user accounts, whereas individual customers typically require straightforward, personal use products or services.

Furthermore, the identification of a customer's specific product or service interest allows for the routing of calls to agents specialized in that domain, ensuring that customers are paired with an appropriate call agent. Account status identification aids agents in customizing their approach, such as providing onboarding assistance to new customers, loyalty solutions to existing customers, or product information to potential customers.

By categorizing calls according to issue or inquiry type, such as technical support or billing inquiries, the computer system 100 can ensure that calls are directed to agents who are best prepared to address the specific issues of the customer. The classification of calls based on a priority level assists in the management of the call center's workload by identifying calls that necessitate immediate attention, thereby ensuring that urgent issues are promptly addressed.

Demographic information, including but not limited to age, gender, location, or language preference, can aid in the further customization of support, enabling communication styles and solutions that more effectively resonate with the customer's background. Additionally, an understanding of the customer nature, including the customer's temperament or typical interaction pattern, can enable agents to modify their communication strategy, thereby improving the overall service experience.

The sentimental state module 114, which can incorporate both a SER module 116 and a ESM module 118, can be programmed to assess the emotional and sentimental disposition of customers within a call center environment. The sentimental state module 114 can be equipped to process and analyze various forms of customer interaction data, including but not limited to audio data, call log information, and customer feedback, through the application of artificial intelligence algorithms.

In embodiments, the SER module 116 can be adapted to examine customer audio data for vocal characteristics indicative of emotional states. This examination can involve the analysis of parameters such as tone, pitch, volume, and speech rhythm, useful in identifying the underlying emotional context of the customer's verbal communication. Concurrently, the ESM module 118 can be deployed to scrutinize textual data derived from customer call logs and feedback. This scrutiny can entail parsing language use, word choice, grammatical structures, and inflections to ascertain the sentiment conveyed in written or spoken customer interactions.

Utilizing a multifaceted approach, the sentimental state module 114 can integrate the findings from both SER module 116 and ESM module 118 to formulate a comprehensive mood indicator for the customer. This mood indicator is reflective of the customer's current emotional state and sentiment, offering a multidimensional understanding that extends beyond mere lexical analysis to include acoustic emotional cues.

The application of artificial intelligence algorithms within the sentimental state module 114 facilitates a dynamic and context-aware analysis, enabling the real-time determination of a customer's mood indicator based on the confluence of audio and textual emotional cues.

Additionally, the sentimental state module 114 can be configured to compute a customer behavior score for repeat customers, leveraging historical interaction data in conjunction with the current mood indicator determined as described. This computation can involve the integration and analysis of accumulated data pertaining to past interactions of the customer with the call center, which may include previous call logs, feedback submissions, and any recorded instances of customer service engagements.

The process of calculating the customer behavior score can encompass a multifaceted approach, wherein both quantitative and qualitative aspects of the customer's historical interactions are evaluated. Quantitative analysis may consider factors such as the frequency of calls, types of inquiries, and resolution outcomes. Simultaneously, qualitative analysis can delve into the emotional tone and sentiment of these interactions, as captured through the SER module 116 and ESM module 118. The current mood indicator, as derived from the latest customer interaction, provides an additional layer of insight, reflecting the customer's present emotional disposition and potential expectations from the service.

The amalgamation of this data through artificial intelligence algorithms enables the sentimental state module 114 to generate an individual and call specific customer behavior score. This score represents a synthesized measure of the customer's overall engagement pattern, sentiment trends, and emotional trajectory with the call center. By accounting for both historical and contemporaneous emotional and behavioral indicators, the score offers a comprehensive metric that call center agents can utilize to tailor their interaction strategies effectively, to ensure that repeat customers are recognized not just by their immediate needs but are also understood within the context of their entire history of interactions with the call center.

In some embodiments, the customer behavior score can be configured to be represented as a single numerical score within a predefined range. This score can quantify the customer's general mood or disposition based on historical interaction data and current emotional state as analyzed by the sentimental state module 114 and the customer identification and history retrieval module 110. For instance, a score ranging from 0 to 100, where a score closer to 100 indicates a highly positive and engaged disposition, while a score closer to 0 may signify dissatisfaction or disengagement. A specific example within this framework could be a score of 85, suggesting a customer who generally exhibits satisfaction with the service and shows openness to engagement with call center agents.

In alternative embodiments, the customer behavior score can be represented as a string or an array of numbers or characters, each element of which corresponds to specific behavioral traits or dispositions identified during the customer's interactions with the call center. This multidimensional representation allows for a nuanced understanding of the customer's behavior, providing a detailed profile that includes multiple aspects of their interactions and emotional responses. For example, a customer behavior score could be represented as [75, "positive", "high engagement" ], where "75" quantifies the customer's overall satisfaction level on a scale of 0 to 100, "positive" indicates the general mood tone identified from the interaction, and "high engagement" reflects the customer's willingness to interact and participate in problem-solving or service enhancement discussions.

This multifaceted approach to representing the customer behavior score enables the call center system to tailor interactions more precisely. By employing either a singular numerical score or a composite score comprising various elements, the system can adjust the customer service strategy to align with the customer's specific needs, preferences, and emotional state to ensure that the call center can provide personalized and effective support, enhancing the overall customer experience and fostering positive customer relationships.

The agent matching module 120 can be configured to align customers with call agents based on the calculated customer behavior score, as derived from the sentimental state module 114 in concert with the customer identification and history retrieval module 110. The agent matching module 120 can utilize an algorithmic approach to assess the compatibility between the nuanced needs and preferences of the customer, as encapsulated by their behavior score, and the expertise, skill set, and emotional intelligence of available call agents.

For example, consider an older customer experiencing repeated difficulties with a new online feature of their checking account. The customer identification and history retrieval module 110, having recorded these ongoing issues, contributes to a customer behavior score reflective of the customer's need for patient, clear, and possibly step-by-step guidance. The sentimental state module 114, recognizing the customer's possible frustration or confusion from their tone in past interactions, adjusts the behavior score accordingly. The agent matching module, 120 then identifies a call agent with a track record of successfully assisting customers with similar profiles—particularly those who benefit from a slower-paced, highly detailed communication style—and a history of resolving issues related to online banking features for older customers. This tailored match ensures that the customer's experience is positive and that their issues are resolved efficiently and empathetically.

In a second scenario, a tech-savvy customer seeks assistance in customizing the output of certain online reporting features of their bank account. This customer's behavior score, informed by their history of engaging with advanced features and providing constructive feedback on digital services, signals a preference for quick, technical discussions and an appreciation for in-depth knowledge of the banking platform's capabilities. The sentimental state module 114, analyzing the customer's confident and direct communication style, further refines this score. Consequently, the agent matching module 120 aligns the customer with a call agent known for technical proficiency and the ability to engage in detailed discussions about the bank's digital tools, ensuring a match that resonates with the customer's expectations and technical curiosity.

The guide experience module 122 can be configured to generate call handling instructions based on the customer behavior score, while also facilitating communication with the IVR subsystem 102 for the display of pertinent customer information alongside the generated instructions. This integration enables the transmission of data between the guide experience module 122 and the IVR subsystem 102, ensuring that call agents are presented with a comprehensive overview of the customer's profile, behavior score, and tailored call handling strategies upon the initiation of the interaction.

For example, when a repeat customer initiates a call and is identified by the customer identification and history retrieval module 110, the guide experience module 122 calculates the appropriate call handling instructions based on the customer's behavior score. Concurrently, it retrieves relevant customer data, including previous interaction history, current mood indicator, and any specific notes or flags that may inform the agent's approach. This information and the instructions are then communicated to the IVR subsystem 102, which displays them on the call agent's interface before or as the call is connected.

A specific instance of this process could involve a customer known for expressing dissatisfaction with previous service resolutions, identified by a behavior score indicating a propensity for frustration. The guide experience module 122 could generate instructions advising the agent to adopt a conciliatory and empathetic communication style, highlighting the importance of acknowledging the customer's past experiences. Simultaneously, the engine can present to the IVR subsystem 102 a summary of the customer's previous issues, their behavior score, and any relevant product information that could aid in resolution, to ensure that the agent is equipped with the context and strategy needed to effectively address the customer's concerns.

An agent sentiment analysis module 124 can integrate the functionalities of the SER module 116 and the ESM module 118, or analogous modules, to conduct an analysis of agent audio data, allowing for a evaluation of both the acoustic and linguistic aspects of the agent's communications. Specifically, the SER module 116 can focus on the analysis of vocal attributes such as tone, pitch, and modulation, which are indicative of the agent's emotional state during customer interactions. Concurrently, the ESM module 118 can examine the linguistic content of the agent's speech for emotional sentiment cues, including word choice and speech patterns, to assess the agent's psychological disposition.

In addition to real-time analysis, the agent sentiment analysis module 124 can be configured to compile and maintain a historical log of agent interactions. This log can capture detailed information on each agent's communication style, emotional responses, and interaction outcomes over time. By aggregating this data, the agent sentiment analysis module 124 can create a contextual backdrop against which current sentiment analyses are gauged, enabling a more accurate understanding of changes in an agent's emotional and psychological state.

For example, an agent who consistently demonstrates positive emotional engagement and receives favorable feedback from customers could establish a historical profile characterized by high sentiment indicators. Should this agent encounter a series of challenging interactions leading to a noticeable deviation in emotional tone as detected by SER module 116 and linguistic sentiment as analyzed by ESM module 118, the agent sentiment analysis module 124 can contextualize this shift against the agent's typical performance baseline, which allows for the identification of anomalies that may signal stress or fatigue.

Conversely, an agent with a variable interaction history experiencing similar challenging interactions might not exhibit as pronounced a deviation in sentiment indicators. In this case, the historical log provides insight into the agent's resilience and adaptability, informing tailored support strategies to enhance their well-being and performance.

As previously disclosed, the agent matching module 120 is configured to match customers with call agents, taking into account both the customer behavior score and the current agent sentiment indicator. In some embodiments, the process involves an analysis whereby the agent matching module 120 assesses the compatibility between the specific needs and emotional disposition of the customer, as encapsulated by the customer behavior score, against the background of the call agent's current capacity to engage effectively, as denoted by the agent sentiment indicator. This dual-axis assessment ensures that customers are matched with agents who are not only equipped with the appropriate skill set and knowledge base but also in an optimal state of readiness and emotional alignment to address the customer's needs and preferences.

For instance, a customer identified with a high behavior score indicating a preference for detailed technical discussions and a positive disposition towards exploring new services might be matched with a call agent whose sentiment indicator reflects high engagement levels, enthusiasm for technical challenges, and a track record of effective problem-solving in similar contexts. This strategic pairing increases the potential for a productive and satisfying interaction for both the customer and the agent.

Conversely, a customer with a behavior score signaling recent frustrations with service issues and a need for empathetic communication can be matched with an agent whose sentiment indicator suggests a calm, patient demeanor, and a noted ability to navigate sensitive interactions successfully. The agent matching module 120, by considering the agent's current psychological readiness and emotional state, ensures that the agent is well-suited to address the customer's concerns in a manner that is likely to rebuild trust and satisfaction.

The alert module 126 can be structured to monitor the current agent sentiment indicator, as derived from the agent sentiment analysis module 124, and to issue notifications when this indicator falls below a pre-established threshold. This functionality can play an important role in ensuring that call center operations proactively address the well-being of call agents by identifying when an agent's emotional state may affect their capacity to provide optimal customer service. The alert module 126 can utilize predefined criteria, based on empirical data and operational best practices, to determine the thresholds that trigger alerts.

Upon the detection of an agent sentiment indicator reaching a threshold that suggests elevated stress levels or potential burnout, the alert module 126 can initiate a notification protocol. This protocol can encompass alerting supervisory personnel to the agent's current state, recommending immediate actions such as scheduling breaks, offering support resources, or temporarily adjusting the agent's call load, in an effort to mitigate adverse effects on the agent's well-being and maintain the quality of customer interactions.

A specific instance of this mechanism in operation could involve a call agent who commences their shift with a positive sentiment indicator, reflecting readiness and optimism for the day's interactions. However, over the course of several hours, the agent encounters a succession of challenging and confrontational customer interactions. These difficult encounters result in a progressive decline in the agent's sentiment indicator, as evidenced by changes in vocal stress markers and negative linguistic cues analyzed by the agent sentiment analysis module 124.

As the agent's sentiment indicator deteriorates to a point that crosses the predefined stress threshold, the alert module 126 can automatically generate a notification, for example, directed to the call center's management team. This notification can include details of the agent's sentiment trajectory and an intervention recommendation. Based on this notification or alert, management or the computer system 100 can schedule a break for the agent, allowing them time to recuperate and receive support if necessary.

The instruction generation and template module 128 can be configured to create and dispense call handling instructions, inclusive of chat templates, which can be orchestrated by the guide experience module 122 based upon the customer behavior score. The instruction generation and template module 128 can leverage generative AI technologies in conjunction with one or more predefined model scripts to formulate conversation cues and templates that assist call agents during customer interactions. The use of generative AI allows for the dynamic customization of communication strategies, ensuring that the templates and cues are not only relevant to the specific context of each customer interaction but also adhere to best practices in customer service.

Operationally, the instruction generation and template module 128 can synthesize input from the customer behavior score, which encapsulates an understanding of the customer's preferences, historical interactions, and current emotional state, to generate tailored conversation templates.

The templates can serve as a guideline for call agents, providing structured prompts and cues designed to navigate the conversation effectively. The generative AI component can adapt the content of these templates in real-time, ensuring alignment with the evolving context of the customer interaction and incorporating insights from model scripts that encapsulate proven communication techniques.

For instance, in a scenario where the computer system 100 identifies a repeat customer with a high preference for concise and informative communication based on their behavior score, the instruction generation and template module 128 can generate a chat template that emphasizes clarity, brevity, and the provision of straightforward solutions. During the call, the generative AI can tailor the template in real-time, providing the call agent with specific cues such as "Briefly summarize the solution before providing details." Additionally, if the conversation veers towards topics where the customer has previously expressed dissatisfaction, the system can provide cues like "Acknowledge past issues and offer reassurance."

The integration of generative AI with model scripts enable the instruction generation and template module 128 to facilitate interactions that are not only personalized to the customer's profile and preferences but also navigate through the call in an efficient and user-friendly manner. This approach enhances the effectiveness of the call agents in delivering service that meets or exceeds customer expectations, thereby improving customer satisfaction and loyalty.

The product and service recommendation module 130 can be configured to identify and suggest one or more products or services suitable for promotion to a customer, leveraging insights derived from historical interaction data and/or the current mood indicator. The product and service recommendation module 130 can utilize algorithms to analyze comprehensive datasets, encompassing the customer's past interactions, preferences, feedback, and recent emotional states as determined by the sentimental state module 114. The integration of these data points allows for the generation of tailored recommendations that align with the individual needs and dispositions of customers.

In operation, the product and service recommendation module 130 can process the accumulated historical interaction data to identify patterns, preferences, and outcomes of previous engagements with the customer. This analysis can include, but is not limited to, reviewing products or services previously inquired about or purchased, assessing satisfaction levels with past recommendations, and noting any expressed needs or interests that may not have been fully addressed. Concurrently, the product and service recommendation module 130 can evaluate the current mood indicator to gauge the customer's present emotional readiness for receiving promotional information, ensuring that the timing and context of recommendations are optimized for receptivity.

For instance, if the product and service recommendation module 130 identifies a customer who has shown consistent interest in home equity line of credit products based on historical interaction data and currently exhibits a positive mood indicator, the product and service recommendation module 130 may recommend addressing any questions with an agent specialized in home equity products. This specific agent match could be facilitated by the agent matching module 120, which considers both the agent's expertise in home equity lines and their current sentiment indicator to ensure a productive and engaging interaction. The recommendation to connect the customer with a specialized agent is communicated to the call agent through the instruction generation and template module 128, providing a seamless bridge to an expert consultation.

Conversely, a customer with a history of seeking cost-saving solutions, combined with a current mood indicator suggesting sensitivity or concern, might be presented with promotions for budget-friendly options or loyalty discounts tailored to their circumstances. The engine's capability to adapt recommendations based on the nuanced understanding of both historical and current customer data exemplifies its role in facilitating personalized and effective marketing engagements.

Figure 3:
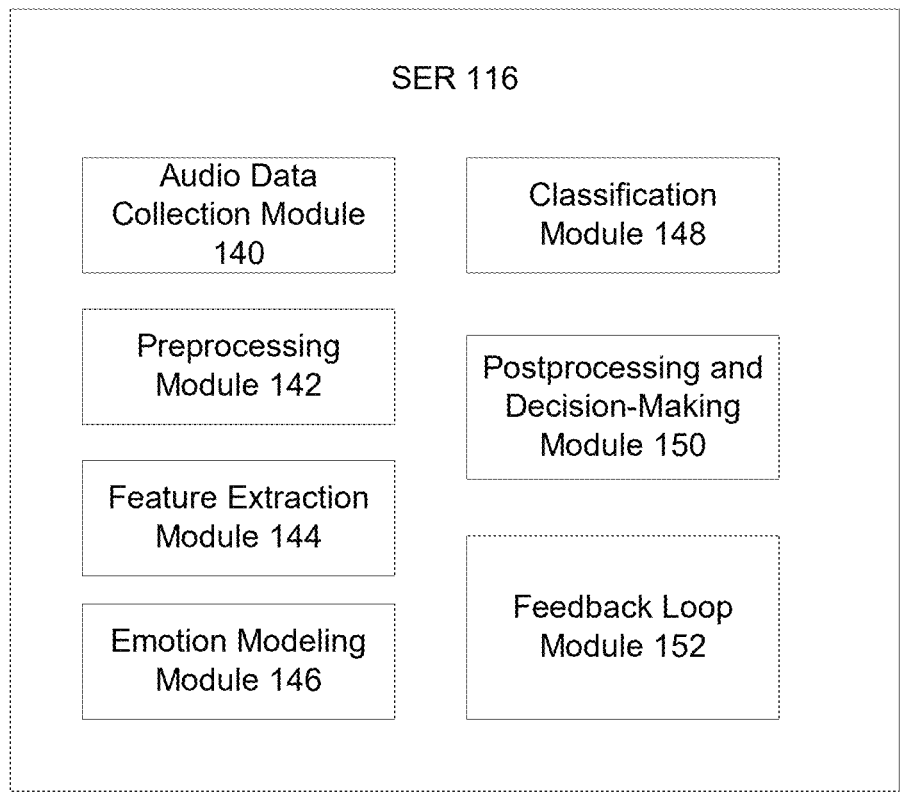
FIG. 3 shows an example speech emotion recognition module of the call handling recommendation device of FIG. 2.

With additional reference to FIG. 3, additional details of the example SER module 116 are depicted in accordance with an embodiment of the disclosure. In some embodiments, the SER module 116 can include one or more modules or engines, with each module or engine configured as a specialized component adapted to perform specific computational processing tasks within the computer system 100. For example, in some embodiments, the SER module 116 can include an audio data collection module 140, a preprocessing module 142, a feature extraction module 144, an emotion modeling module 146, a classification module 148, a postprocessing and decision-making module 150, and a feedback loop module 152 for continuous improvement.

In some embodiments, the audio data collection module 140 can serve as a hub within the SER module 116, tasked with the acquisition of audio data from various interactions, notably customer calls within the call center environment. The audio data collection module 140 can be configured to capture raw voice recordings, thereby establishing the initial dataset for subsequent emotional analysis.

Following data acquisition, the preprocessing module 142 can refine the raw audio data to enhance its quality and analytical suitability. This can involve a series of operations such as noise reduction, to mitigate background interference, normalization of volume levels, to ensure consistency across recordings, and the segmentation of speech components from non-speech elements, preparing the data for more focused emotional analysis.

The feature extraction module 144 can be configured to analyze the preprocessed audio data to identify and isolate features related to emotional state determination. This module examines various aspects of the audio signal, including prosodic features, which relate to the speech's rhythm, pitch, and intensity; spectral features, such as Mel-Frequency Cepstral Coefficients, which provide insight into the sound's timbral qualities; voice quality features, including jitter and shimmer, reflecting variations in pitch and amplitude; and Teager Energy Operator, offering measurements of vocal tract energy dynamics, which can collectively form the basis for accurate emotion inference.

Within the emotion modeling module 146, the extracted features can undergo analysis to construct a predictive model of the speaker's emotional state. Leveraging advanced computational techniques, including support vector machines, convolutional neural networks, and recurrent neural networks, the emotion modeling module 146 can interpret the feature set to classify emotional states, encapsulating the nuanced spectrum of human emotions within the call center interactions.

The classification module 148 can be tasked with applying the emotion model to the feature set, culminating in the classification of the observed emotion within the audio data. The classification can span a predefined array of emotions, enabling the identification of specific emotional states such as happiness, sadness, anger, and frustration, among others, thus providing a granular understanding of the customer's emotional disposition.

Post-classification, the postprocessing and decision-making module 150 can engage in further analysis and application of the classified emotional data, which can include determining the intensity of the detected emotions and integrating this emotional insight with other operational systems, such as customer service databases, to inform and guide decision-making processes, such as call routing based on the customer's emotional state.

The feedback loop module 152 enables continuous refinement and enhancement of the SER module 116 system. By integrating feedback from various sources, including customer satisfaction surveys and agent reports, the feedback loop module 152 can provide improvements to the emotion models, feature extraction methodologies, and overall system performance, ensuring that the SER module 116 remains responsive and accurate in its emotional analyses over time.

Figure 4:
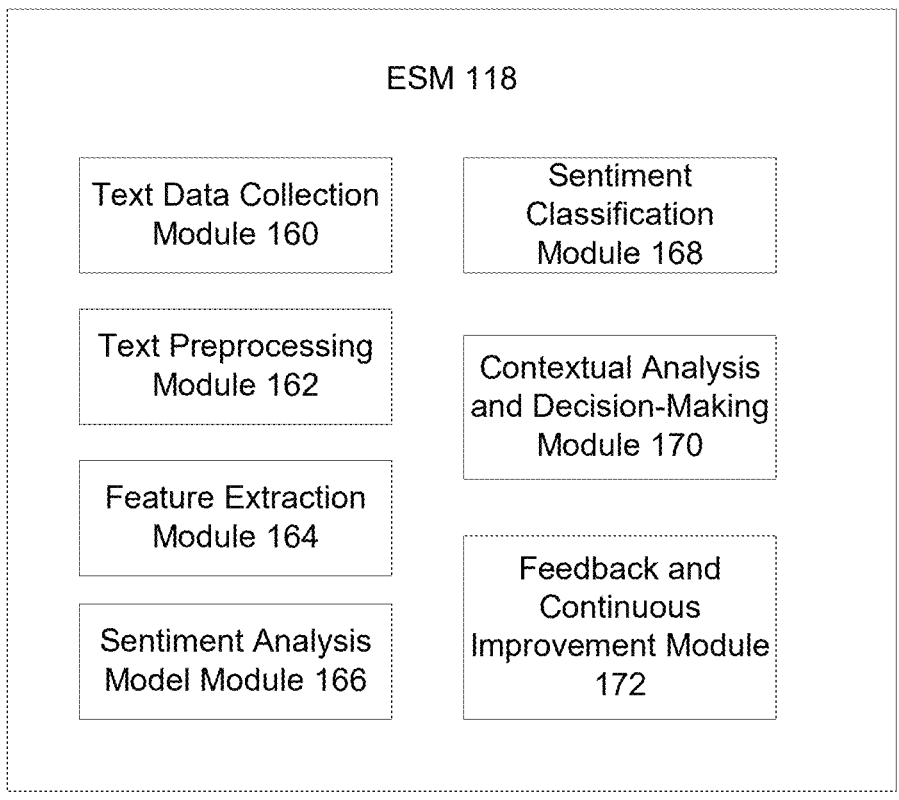
FIG. 4 shows an example emotion sentiment model module of the call handling recommendation device of FIG. 2.

With additional reference to FIG. 4, additional details of the example ESM module 118 are depicted in accordance with an embodiment of the disclosure. In some embodiments, the ESM module 118 can include one or more modules or engines, with each module or engine configured as a specialized component adapted to perform specific computational processing tasks within the computer system 100. For example, in some embodiments, the ESM module 118 can include a text data collection module 160, text preprocessing module 162, feature extraction module 164, sentiment analysis model module 166, sentiment classification module 168, contextual analysis and decision-making module 170, and feedback and continuous improvement module 172.

In some embodiments, the text data collection module 160 can comprise the initial stage of the ESM module 118, dedicated to the aggregation of textual data emanating from a variety of customer interactions. This can include transcripts of customer calls, written feedback, electronic communications, and other forms of textual data. The text data collection module 160 can serve to compile a comprehensive dataset that serves as the basis for subsequent sentiment analysis, ensuring a broad and representative collection of customer expressions for accurate sentiment assessment.

Following collection, the text preprocessing module 162 can be tasked with refining and standardizing the amassed textual data to render it suitable for detailed analysis. The text preprocessing module 162 can execute several preprocessing operations including tokenization, which segments the text into its constituent words or phrases; the elimination of stop words, which are common but non-informative words; stemming, which simplifies words to their base or root form; and lemmatization, which adjusts words to their dictionary form. These processes collectively prepare the text for enhanced analytical accuracy in the sentiment analysis phase.

The feature extraction module 164 can undertake the analysis of the preprocessed text to isolate features that are indicative of sentiment. The analysis can involve the identification of keywords, phrases, and patterns imbued with sentiment, as well as the examination of syntactic structures and usage patterns that may influence the sentiment conveyed. The analysis by the feature extraction module 164 can lay the groundwork for constructing a nuanced understanding of the emotional content embedded within the text.

Utilizing the extracted textual features, the sentiment analysis model module 166 can apply a range of computational techniques to evaluate and classify the sentiment embodied in the textual data. The sentiment analysis model module 166 can harness methodologies from natural language processing and machine learning, including support vector machines, convolutional neural networks, and recurrent neural networks, to discern whether the text reflects a positive, negative, or neutral sentiment, establishing a foundational sentiment assessment.

The sentiment classification module 168 can build on the foundational assessment to categorize the text's sentiment into more specific emotional states or classes, such as happiness, sadness, anger, or frustration. This classification can enrich the sentiment analysis by providing a granular understanding of the emotional tones present within the customer interactions, facilitating a deeper insight into customer sentiment.

Further depth can be added by the contextual analysis and decision-making module 170, which can integrate contextual insights from the customer's historical interactions and specific textual nuances to refine the sentiment analysis. In embodiments, the contextual analysis and decision-making module 170 can evaluate the context in which sentiment-laden words or phrases appear, enabling a more accurate interpretation of sentiment and guiding subsequent decision-making or actions, such as the personalization of customer service responses or the strategic routing of texts for further handling.

The feedback and continuous improvement module 172 can be configured to enable ongoing optimization of the ESM module 118. By incorporating feedback from the practical application of sentiment analysis, including customer and agent responses, the feedback and continuous improvement module 172 can iteratively refine the sentiment analysis models, feature extraction processes, and overall analytical performance to ensure that the ESM module 118 maintains its relevance and accuracy in sentiment analysis, adapting over time to evolving language use and emotional expression patterns.

Figure 5:
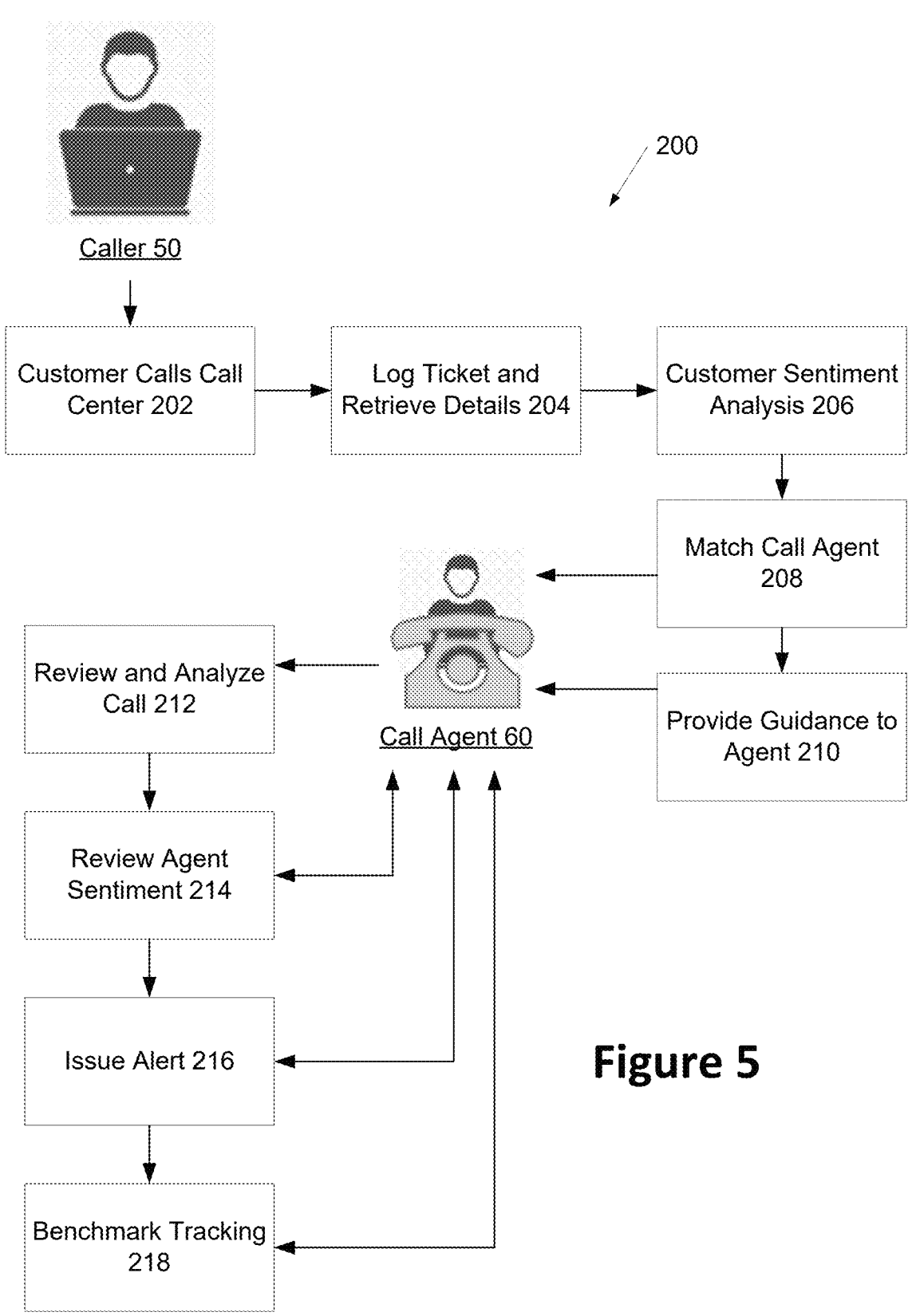
FIG. 5 shows a method for improving call center routing through analysis of customer interactions.

Referring to FIG. 5, an example method 200 is shown for optimizing call center routing by analyzing customer interactions, presented in accordance with an embodiment of the disclosure. The method 200 encompasses a sequence of steps aimed at enhancing the efficiency and personalization of customer service through the analysis of interaction data and sentiment. In some examples, the method 200 can be implemented by the system 100 described above.

At step 202, the method 200 initiates when a customer contacts the call center via the IVR subsystem 102. This entry point marks the commencement of the data-driven routing process designed to streamline customer service interactions.

Proceeding to step 204, the computer system 100 records the initiation of a service request and, through a collaborative process between the IVR subsystem 102 and the call handling recommendation device 104, retrieves the customer's existing information from the database 112 for informing subsequent steps with historical customer data.

At step 206, the call handling recommendation device 104 analyzes the retrieved customer details, classifying the customer based on historical interaction data and the current sentiment analysis provided by the sentimental state module 114. Additionally, the guide experience module 122, in conjunction with the instruction generation and template module 128, evaluates various customer parameters to formulate a personalized chat template. This template facilitates a tailored interaction strategy, incorporating demographic information for initial greetings and leveraging product and service insights from the service recommendation module 130 for contextual cross-selling opportunities.

In step 208, the call handling recommendation device 104 proceeds to match the customer with an appropriately skilled call agent based on the analysis conducted in step 206. The match is then facilitated, and the call is directed to the selected agent through the IVR subsystem 102.

Step 210 involves forwarding comprehensive customer details to the agent device 60 via the IVR subsystem 102. These details include, but are not limited to, a script or specific instructions on engaging with the customer, thereby equipping the agent with the necessary information and strategies to personalize the customer interaction effectively.

Upon the conclusion of the call at step 212, the interaction is recorded and transformed into a transcript, upon which sentimental analysis is performed. This step allows for the continuous updating and refinement of the SER module 116 and/or ESM module 118 based on the latest customer interactions.

At step 214, an evaluation of the agent's sentimental state is conducted by comparing the current interaction's sentiment against the agent's established performance benchmarks, facilitated by the agent sentiment analysis module 124.

Should there be a notable decline in the agent's sentiment as identified in step 216, the alert module 126 initiates a protocol to recommend a break or stress-relief measure for the agent. This intervention is critical for sustaining agent morale and operational effectiveness.

Finally, step 218 captures the agent's actions in response to the recommendations made in step 216, including any rest periods or adjustments to their operational benchmarks. This information is used to refine future logic and decision-making processes within the system, closing the feedback loop and ensuring continuous improvement in agent management and customer service delivery.

Method 200 delineates a comprehensive approach to managing call center interactions, emphasizing the integration of data analysis, sentiment assessment, and personalized service strategies to enhance customer satisfaction and agent efficiency.

Figure 6:
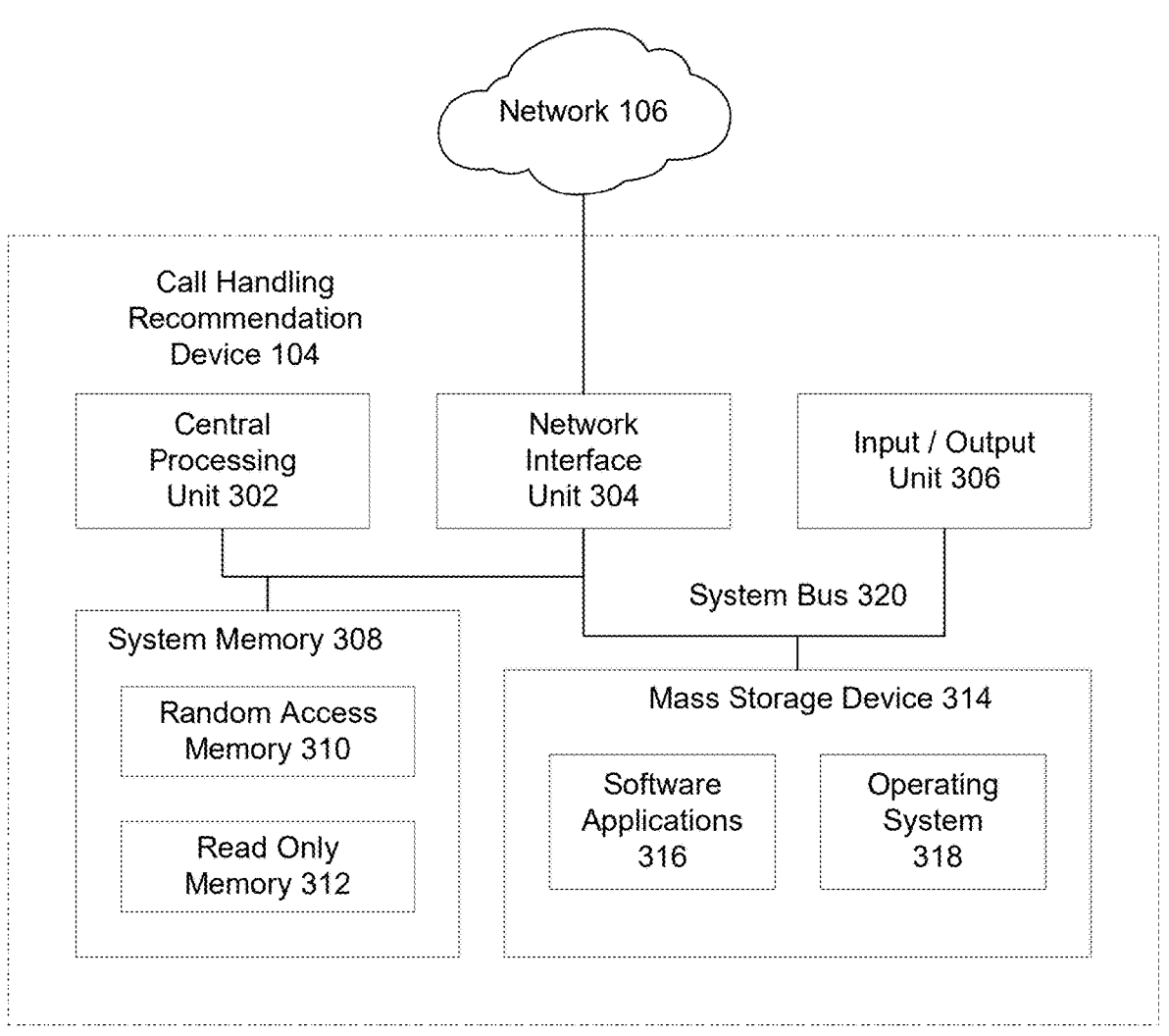
FIG. 6 shows example physical components of the call handling recommendation device of FIG. 2.

As illustrated in the embodiment of FIG. 6, the example call handling recommendation device 104, which provides the functionality described herein, can include at least one central processing unit ("CPU") 302, a system memory 308, and a system bus 320 that couples the system memory 308 to the CPU 302. The system memory 308 includes a random access memory ("RAM") 310 and a read-only memory ("ROM") 612. A basic input/output system containing the basic routines that help transfer information between elements within the computer system 100, such as during startup, is stored in the ROM 312. The computer system 100 further includes a mass storage device 314. The mass storage device 314 can store software instructions and data. A central processing unit, system memory, and mass storage device similar to that shown can also be included in the other computing devices disclosed herein.

The mass storage device 314 is connected to the CPU 302 through a mass storage controller (not shown) connected to the system bus 320. The mass storage device 314 and its associated computer-readable data storage media provide non-volatile, non-transitory storage for the computer system 100. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the call handling recommendation device 104.

According to various embodiments of the invention, the computer system 100 may operate in a networked environment using logical connections to remote network devices through network 108, such as a wireless network, the Internet, or another type of network. The network 108 provides a wired and/or wireless connection. In some examples, the network 108 can be a local area network, a wide area network, the Internet, or a mixture thereof. Many different communication protocols can be used.

The call handling recommendation device 104 may connect to network 108 through a network interface unit 304 connected to the system bus 320. It should be appreciated that the network interface unit 304 may also be utilized to connect to other types of networks and remote computing systems. The call handling recommendation device 104 also includes an input/output controller 306 for receiving and processing input from a number of other devices, including a touch user interface display screen or another type of input device. Similarly, the input/output controller 306 may provide output to a touch user interface display screen or other output devices.

As mentioned briefly above, the mass storage device 314 and the RAM 310 of the call handling recommendation device 104 can store software instructions and data. The software instructions include an operating system 318 suitable for controlling the operation of the call handling recommendation device 104. The mass storage device 314 and/or the RAM 310 also store software instructions and applications 316, that when executed by the CPU 302, cause the call handling recommendation device 104 to provide the functionality of the computer system 100 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for improving call center routing through analysis of customer interactions, the method comprising:
    obtaining identifying information for a caller upon initiation of a call;
    identifying the caller as a repeat customer using the identifying information;
    retrieving historical interaction data associated with the repeat customer;
    analyzing the historical interaction data, utilizing an artificial intelligence algorithm, to determine a current mood indicator of the repeat customer;

calculating a customer behavior score within a predefined numeric range for the repeat customer based on the historical interaction data and the current mood indicator of the repeat customer, wherein the customer behavior score quantifies quantitative and qualitative aspects of the historical interaction data and the current mood indicator for the repeat customer; and
    matching the repeat customer to a call agent based on the customer behavior score.

2. The method of claim 1, further comprising analyzing agent audio data of the call agent to determine a current agent sentiment indicator.

3. The method of claim 2, wherein matching the repeat customer to the call agent considers both the customer behavior score and the current agent sentiment indicator.

4. The method of claim 2, further comprising providing a notification upon the current agent sentiment indicator meeting or exceeding a defined threshold.

5. The method of claim 1, further comprising creating call handling instructions for the call agent, based on the customer behavior score.

6. The method of claim 5, wherein the call handling instructions include a chat template for directing a conversation with the repeat customer, based on the customer behavior score.

7. The method of claim 1, further comprising identifying one or more products or services for promotion to the repeat customer, based on at least one of the historical interaction data or the current mood indicator.

8. The method of claim 1, wherein the artificial intelligence algorithm employs both a speech emotion recognition model and an emotional sentiment model.

9. The method of claim 8, wherein the speech emotion recognition model is configured to analyze at least one of a pitch, volume or speech rhythm of customer audio data.

10. The method of claim 8, wherein the emotional sentiment model is configured to analyze at least one of a word choice, grammatical choice or inflection of customer audio data.

11. A computer system for improving call center routing through analysis of customer interactions, comprising:
    one or more processors; and
    non-transitory computer-readable storage media encoding instructions which, when executed by the one or more processors, cause the computer system to:
        obtain identifying information for a caller upon initiation of a call;
        identify the caller as a repeat customer using the identifying information;
        retrieve historical interaction data associated with the repeat customer from a database;
        analyze any combination of customer audio data, customer call log information, or customer feedback, utilizing an artificial intelligence algorithm to determine a current mood indicator of the repeat customer;
        calculate a customer behavior score within a predefined numeric range for the repeat customer based on the historical interaction data and the current mood indicator of the repeat customer, wherein the customer behavior score quantifies quantitative and qualitative aspects of the historical interaction data and the current mood indicator for the repeat customer; and
        match the repeat customer to a call agent, based on the customer behavior score.

12. The computer system of claim 11, wherein the computer system is further configured to analyze agent audio data of the call agent to determine a current agent sentiment indicator.

13. The computer system of claim 12, wherein matching the repeat customer to the call agent considers both the customer behavior score and the current agent sentiment indicator.

14. The computer system of claim 12, wherein the computer system is further configured to provide a notification upon the current agent sentiment indicator meeting or exceeding a defined threshold.

15. The computer system of claim 11, wherein the computer system is further configured to create call handling instructions for the call agent, based on the customer behavior score.

16. The computer system of claim 15, wherein the call handling instructions include a chat template for directing a conversation with the repeat customer, based on the customer behavior score.

17. The computer system of claim 11, wherein the computer system is further configured to identify one or more products or services for promotion to the repeat customer, based on at least one of the historical interaction data or the current mood indicator.

18. The computer system of claim 11, wherein the artificial intelligence algorithm employs both a speech emotion recognition model and an emotional sentiment model.

19. The computer system of claim 18, wherein the speech emotion recognition model is configured to analyze at least one of a pitch, volume or speech rhythm of the customer audio data.

20. The computer system of claim 18, wherein the emotional sentiment model is configured to analyze at least one of a word choice, grammatical choice or inflection of the customer audio data.

* * * * *